United States Patent

[11] 3,603,350

| [72] | Inventor | Edwin P. Monroe<br>255 Barrett Rd., Berea, Ohio 44017 |
|------|----------|---|
| [21] | Appl. No. | 777,857 |
| [22] | Filed | Nov. 21, 1968 |
| [45] | Patented | Sept. 7, 1971 |

[54] REINFORCED ELASTIC MATERIAL AND METHODS OF MANUFACTURE
3 Claims, 13 Drawing Figs.

[52] U.S. Cl.............................................. 138/126,
156/149, 248/400, 267/153
[51] Int. Cl........................................................ F16l 11/08
[50] Field of Search............................................ 138/124,
125, 126, 127; 156/149, 172; 161/91; 267/143,
145, 152, 153; 248/399, 400, 358; 297/216

[56] References Cited
UNITED STATES PATENTS

| 2,273,200 | 2/1942 | Hoff | 138/126 X |
| 2,652,093 | 9/1953 | Burton | 138/126 UX |
| 2,788,804 | 4/1957 | Larkin | 138/125 |
| 3,068,906 | 12/1962 | Rittenhouse | 138/126 |
| 3,116,759 | 1/1914 | Webb | 138/125 |

FOREIGN PATENTS

| 582,278 | 11/1946 | Great Britain | 138/126 |

Primary Examiner—Laverne D. Geiger
Assistant Examiner—Richard J. Sher
Attorney—J. H. Slough

ABSTRACT: There is disclosed herein an inflatable elastic boot having an open mesh net reinforcement limiting and controlling the expansion of the boot under pressure; and methods of manufacture comprising rotating a drum in baths of uncured elastic material, wrapping the drum with the net between baths, and curing the elastic material.

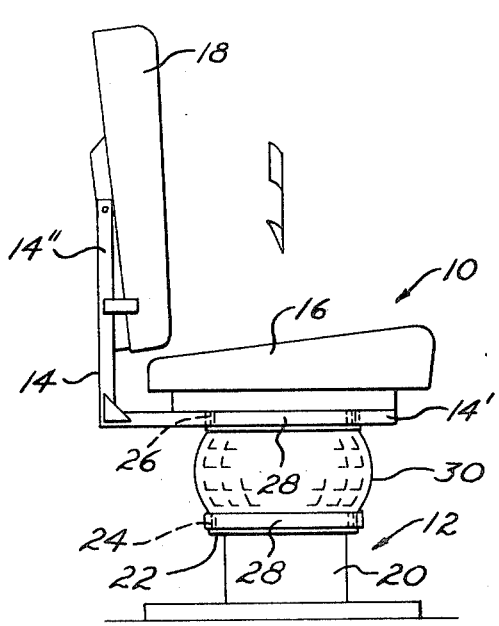
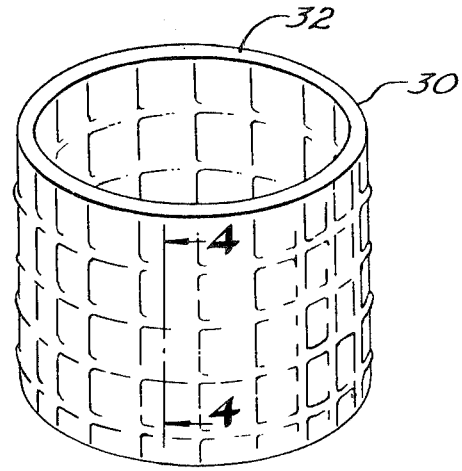
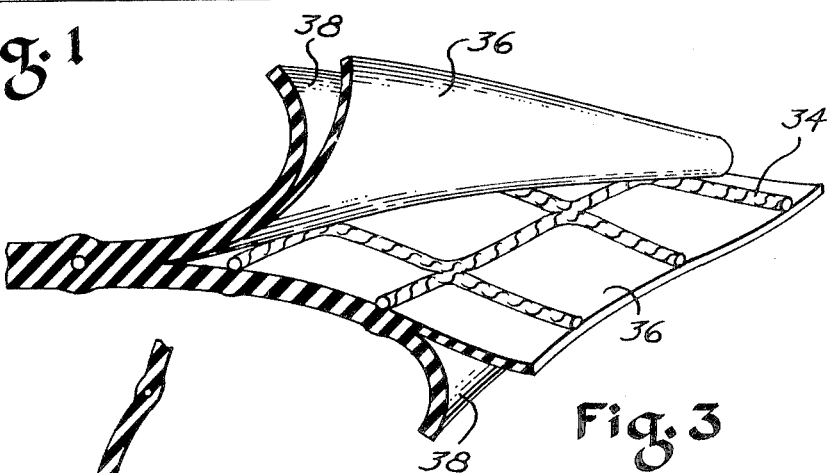
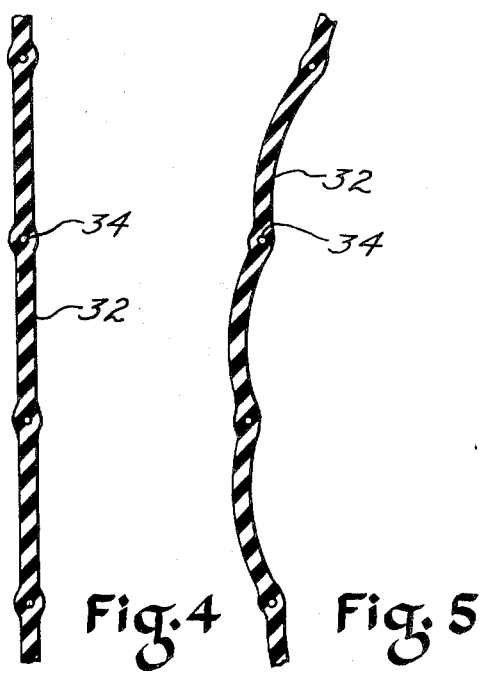

INVENTOR
Edwin P. Monroe
BY
J. H. SLOUGH
ATTORNEY

REINFORCED ELASTIC MATERIAL AND METHODS OF MANUFACTURE

This invention relates to reinforced elastic sheet material and methods for the manufacture thereof and relates more particularly to providing such material in the form of an elastic boot for use in a suspension device such as the vehicle seat suspension means disclosed in my copending application, Ser. No. 788,228, filed Dec. 31, 1968.

The aforementioned invention comprises means for mounting a vehicle seat for limited vertical movement and includes a cylindrical elastic boot disposed on a vertical axis and connected in airtight engagement between the seat and base means mounted on the vehicle floor. The boot is adapted to be air filled and pressurized to provide the desired cushioned ride for a given driver or passenger. The boot flexes and alternately expands and contracts a limited amount to soften the jolting and bouncing motions of the vehicle. However, it has been found that boots of the above type tend to weaken as a result of repeated flexing thereby necessitating the use of greater air pressure and causing the quality of the ride to deteriorate. The boot will also permanently extend or expand with prolonged use and allow the seat to sink, thereby interfering with the normal height adjustment of the seat.

The present invention comprises an elastic boot reinforced by a relatively nonstretchable, open net material which substantially limits flexing of the material to the areas defined by the openings in the net whereby the boot retains its original shape and size throughout a prolonged period of use. The invention further comprehends methods of making the boot comprising rotating a drum in one or more baths of uncured, elastic material, encasing the drum in the netting, again rotating the drum in one or more baths of uncured elastic material, and subsequently curing the material.

It is a primary object of this invention to provide a reinforced elastic material and methods for the manufacture thereof, particularly as the same are applied to a cylindrical elastic boot for use in a shock-absorbing suspension device.

Another object of the invention is to provide an elastic boot of the type referred to which will not permanently extend or expand when used over a prolonged period of time.

Still another object of the invention is to provide an elastic boot as set forth above wherein the areas of expansion and flexure are limited and controlled and wherein the boot as a whole is substantially nonstretchable.

Yet another object of the invention is to provide a method for manufacturing the boot wherein the elastic material and net reinforcing material become an integral, unitary construction.

Still another object is to provide a simple, improved method for forming the boot around a cylindrical drum or mandrel.

A still further object is to provide an improved elastic boot and method for manufacturing the same wherein the boot is highly resistant to oil, gasoline, and other foreign matter to which it may be exposed in a motor vehicle.

Other objects of the invention and the invention itself will become apparent from the following description thereof and the accompanying drawings, in which said drawings:

FIG. 1 is a side elevation of a truck seat mounted upon a suspension means including an elastic boot made according to the present invention;

FIG. 2 is an enlarged perspective view of the boot;

FIG. 3 is a further enlarged, fragmentary sectional detail of the elastic material of the boot;

FIG. 4 is a section through the wall of the boot taken generally along the line 4—4 of FIG. 2;

FIG. 5 is a section similar to FIG. 4, showing the wall of the boot extended under pressure.

Figure 6:
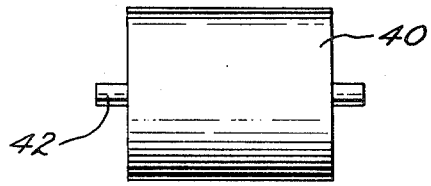
FIGS. 6–13 show sequential steps in methods of manufacturing the elastic material and boot.

Referring now to the drawings in all of which like parts are designated by like reference numerals, a truck seat generally indicated at 10 mounted upon a suspension device generally indicated at 12 is shown in FIG. 1. The seat 10 comprises an L-shaped frame 14 having a seat cushion 16 mounted upon the horizontal portion of the frame, as indicated at 14', and a back cushion 18 mounted upon the vertical portion of said frame, as indicated at 14".

The suspension device 12 includes an upright, cylindrical member 20 secured to the truck floor in any suitable manner and surmounted by upper horizontal plate means 22 which carries an annular collar 24 on the upper surface thereof. The horizontal portion 14' of the seat frame 14 has a similar collar 26 projecting downwardly therefrom directly above the collar 24. A cylindrical elastic boot 30 is telescoped over the collars 24 and 26 at its lower and upper end, respectively, said boot being secured to the collar in any suitable manner such as by means of metal straps 28.

FIG. 2 of the drawings shows the boot 30 in its relaxed or unstressed condition, said boot comprising a circumferentially continuous, elastic wall 32. The elastic material of said wall 32 is detailed in FIG. 3 of the drawings wherein reinforcing net material or netting 34 is encased within layers 36 and 38 of elastic or resilient material. It will be understood that the layers as shown in FIG. 3 are arbitrarily indicate as distinct layers to aid in the understanding of the construction of this invention. In reality, the netting 34 is not sandwiched between layers of resilient material but is integrally bonded to and encased by resilient materials which are integrally fused to each other. This will become readily apparent in connection with the methods of constructing the boot 30, said methods to be herein later fully described in detail.

FIGS. 4 and 5 contrast the condition of the elastic wall 32 when it is in the relaxed position of FIG. 2 and in the extended or expanded condition of FIG. 1, respectively. In FIG. 1, it is assumed that the boot 30 is inflated and under internal pressure and that the weight of the driver and said seat is pressing downwardly as indicated by the arrow in said figure. Under these conditions, the wall 32 expands outwardly somewhat, the amount of expansion being strictly limited and controlled by the relatively nonstretchable netting 34. In the form of the invention as herein illustrated, the net is preferably made of three thirty-seconds inch, preshrunk, nylon strands woven to form a net having 1¼ holes or openings therethrough. This netting has been found to be strong and durable and to contain the expansion or extension of the boot within the desired limits whereby said boot does not lose its shape over the working lifetime thereof. Thus the netting 34 will tend to bow out slightly but further expansion of the boot is strictly limited to the areas of elastic material disposed within the openings or holes in the netting.

In use, the elastic material of the wall 32 will bulge convexly outwardly through the openings in the netting 34 as indicated at 32' in FIG. 5. As the load of the seat 10 and driver increases or decreases due to the jolting motions of the vehicle traveling along the road, the convex bulges 32' will flex outwardly to a greater or lesser degree while the netting 34 retains the boot 30 in a substantially constant shape. The result is that the full cushioning effect of the elastic material is utilized to soften the ride of the driver without substantially changing the shape of the boot and without allowing it to expand outwardly beyond a predetermined amount.

The method for manufacturing the boot 30 and the reinforced elastic material of the wall 32 are clearly shown in the successive steps illustrated in FIGS. 6–13. FIG. 6 represents a drum or mandrel 40 of any suitable length mounted for rotation upon an axle 42. The axle 42 projects laterally beyond the ends of the drum or mandrel 40, and it will be understood that suitable means of a conventional type would be provided for journaling the axle and causing rotation of the drum, said means not being herein illustrated.

Figure 7:
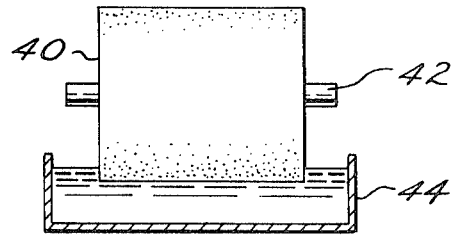

FIG. 7 shows the drum 40 suspended over a first bath 44 of an elastic material in its uncured liquid form. The material of the first bath is preferably one which will provide an inner surface for the boot which is highly resistant to the effects of oil, grease, or other foreign materials associated with motor vehicles. A preferred material is a synthetic rubber such as neoprene. The drum 40 is initially provided with a coating of a nonadhesive substance, such as soapstone, and rotated as an outer peripheral portion thereof is dipped below the surface of the first bath 44 whereby the liquid neoprene is evenly deposited about the periphery of the drum.

Figure 8:
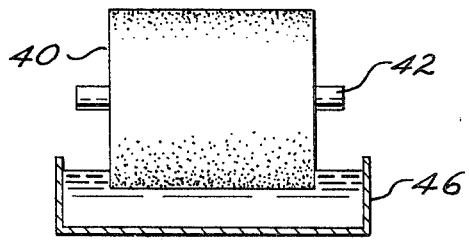

A second step is illustrated in FIG. 8 wherein the drum 40 is disposed above and slightly submerged in a second bath 46 of uncured natural latex in liquid form. As in the step shown in FIG. 7, the drum 40 is rotated to deposit a coating of the liquid latex over the layer of neoprene.

Figure 9:
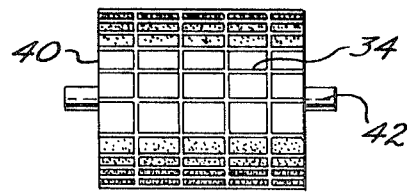

FIG. 9 shows a next step in the manufacture of the boot 30 wherein the netting 34 is wrapped around the drum 40 over the still uncured natural latex. The netting 34 is secured at its circumferentially directed ends in any suitable manner such as by trying to thereby provide a circumferentially continuous reinforcing sheet around the first previously applied resilient material.

In the step shown in FIG. 10, the drum is again rotated over a bath 46 of natural latex whereby the netting 34 is completely encased within the latex.

Figure 11:
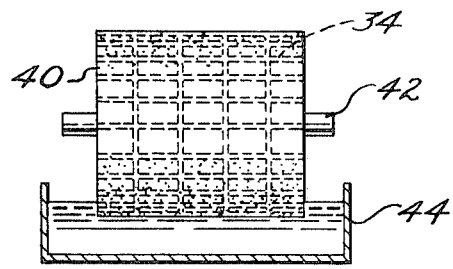

The step of FIG. 11 is similar to that shown in FIG. 7 wherein the drum is again rotated in a bath 44 of liquid neoprene to deposit a final, outer coating of oil and grease resistant material.

Figure 12:
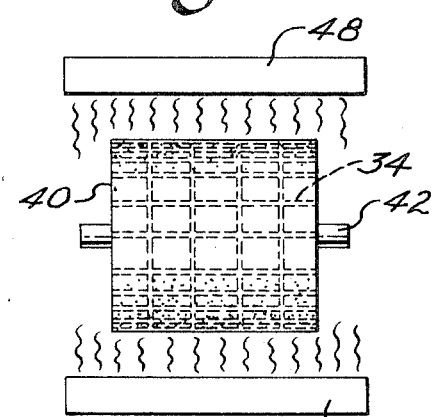

FIG. 12 represents the step of curing all of the material by applying heat thereto as represented by heaters 48. Said heaters may be of any suitable form and type adapted to subject the boot to suitable curing temperatures whereby the uncured resilient materials become an integral, elastic cylinder.

Figure 13:
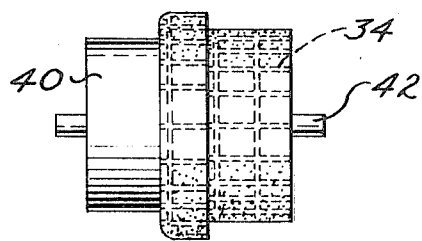

FIG. 13 represents the final step of peeling the finished boot from the drum 40.

It will be understood that the boot 30 may be formed upon a drum or mandrel 40 of any suitable length, an elongated drum providing an elongated, tubular finished product which may be cut into a plurality of boots It will also be understood that the thickness of the coatings of neoprene and latex may be varied by varying the viscosity of the materials in their liquid form in a well-known manner.

Figure 10:
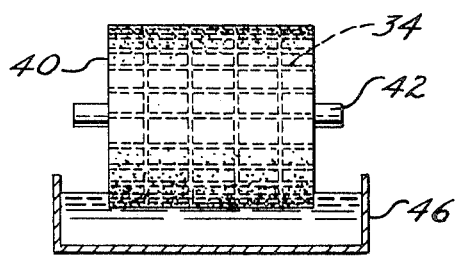

The boot of the present invention may be manufactured by eliminating the steps of FIG. 7 and 11 whereby the drum is first rotated in a bath 46 of latex as shown in FIG. 8, encased in the netting 34 as shown in FIG. 9, and again rotated in a bath 46 of latex as shown in FIG. 10. A boot thus manufactured will be less resistant to the effects of foreign materials such as oil and grease and will be less long wearing but in some installations would prove to be quite satisfactory. The individual coatings of neoprene and latex can be separately adjusted as to thickness by adjusting the viscosity of the material, and the overall thickness of the finished elastic wall 32 can be controlled to attain the desired strength and resilience for a given installation.

From the foregoing description of the method of manufacturing the boot and elastic material of this invention, it will be readily understood that in the showing of FIG. 3, the separation and designation of layers 36 (latex) and 38 (neoprene) is purely arbitrary and for the purpose of showing how the boot is made. In practical effect, all of the resilient material with the netting 34 encased therein becomes one integral wall.

It will be understood that many changes in the details of the invention as herein described and illustrated may be made without, however, departing from the spirit thereof or the scope of the appended claims.

What I claim is:

1. A reinforced elastic boot of tubular form adapted to be connected in airtight engagement between relatively movable members to absorb the shock of one of said members with respect to the other of said members in the direction of the axis of said boot, said boot comprising a reinforcing net having little inherent elasticity and provided with openings therein, said net being formed into a tube; said net encased in elastic material uniformly coating both sides of the net and extending across and closing said openings in the net; said tubular net capable of only slight transverse expansion and said openings being of such size as to allow said elastic material covering said openings to bulge outwardly beyond said net when the boot is at least partially inflated and pressure is applied to move one of said members toward the other of said members whereby said boot cushions the movement between said members without substantial loss of shape.

2. A reinforced elastic boot as set forth in claim 1 said net being preshrunk and comprising three thirty-seconds inch nylon strands woven with 1 ¼ openings therein.

3. A reinforced elastic boot as set forth in claim 2; said elastic material comprising, in section, a central portion of rubber evenly distributed on either side of the net and outer and inner coats of neoprene integrally cured with said rubber.